United States Patent [19]

Wolfe

[11] 4,361,854
[45] Nov. 30, 1982

[54] VIDEO SWITCH FOR A VTR-COMPATIBLE TELEVISION RECEIVER

[75] Inventor: Paul G. Wolfe, Batavia, N.Y.

[73] Assignee: North American Philips Consumer Electronics Corp., New York, N.Y.

[21] Appl. No.: 155,701

[22] Filed: Jun. 2, 1980

[51] Int. Cl.³ .............................................. H04N 5/48
[52] U.S. Cl. .................................... 358/181; 358/188
[58] Field of Search ................... 358/181, 188, 160, 4; 360/33

[56] References Cited

U.S. PATENT DOCUMENTS

| | | | |
|---|---|---|---|
| 3,702,898 | 11/1972 | Webb | 358/181 |
| 4,097,899 | 6/1978 | Yu | 358/181 |
| 4,151,557 | 4/1979 | Iida | 358/181 |

Primary Examiner—Michael A. Masinick
Attorney, Agent, or Firm—Thomas A. Briody; William J. Streeter

[57] ABSTRACT

A circuit for coupling the demodulated composite video signal to a Video Tape Recorder and for selectively coupling either that signal or a signal from an alternate source to the receivers video processing circuitry. The circuit includes diodes having inputs separately connected to the set of video signal sources and outputs coupled in common to a control circuit that determines which signal is coupled to the output and which is isolated from it.

3 Claims, 1 Drawing Figure

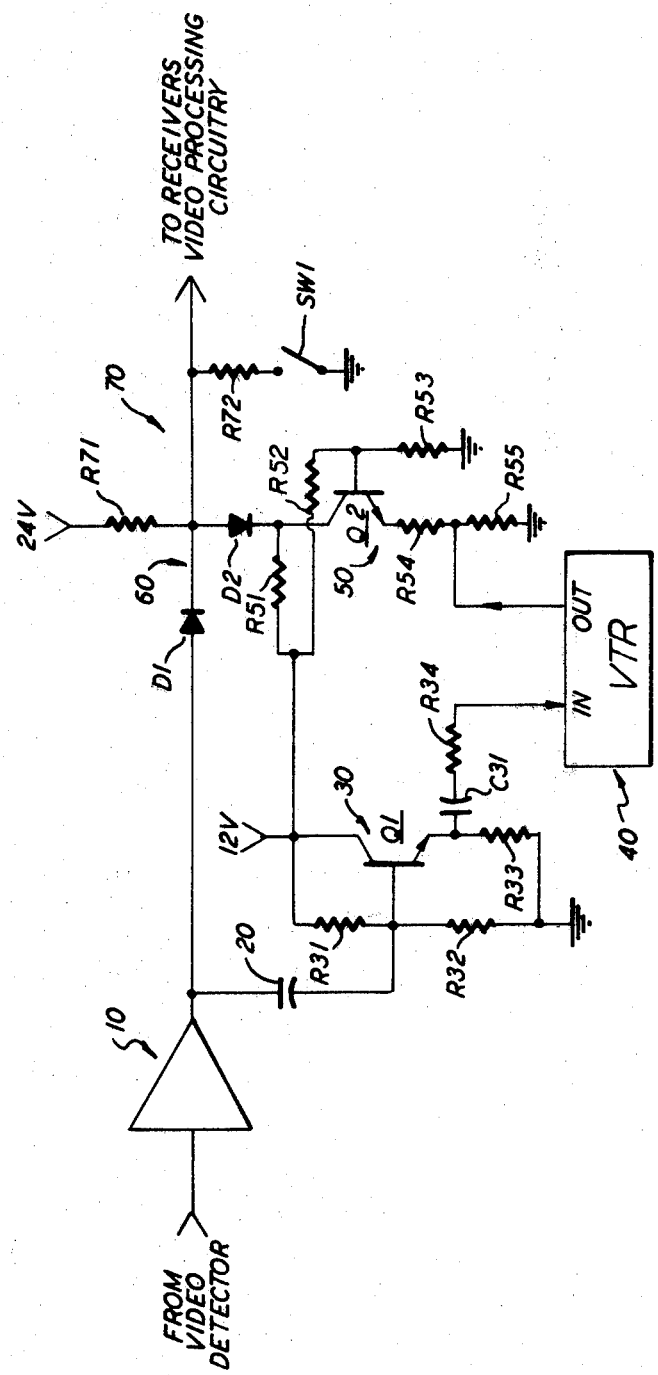

VIDEO SWITCH FOR A VTR-COMPATIBLE TELEVISION RECEIVER

TECHNICAL FIELD

This invention relates to electronic switching circuits and more particularly to a circuit for selecting between alternate sources of video signals to be processed by a television receiver.

BACKGROUND ART

With the emergence as the television receiver as a vehicle for receiving, demodulating, and reproducing more than merely the broadcaster's signals, it has become necessary to provide circuitry for interfacing the receiver with peripheral equipments. Examples of such equipments are video tape and video disc players and home video games. Although these equipments can be made to provide a modulated RF signal that can be coupled to the receiver through its antenna terminals, enhanced picture quality can be achieved by utilizing video signals coupled into the receiver's video processing circuitry. Clearly, when more than one video source is available, means for selecting the desired source must be provided. This invention is directed to a simple and cost-effective video switch for coupling the receiver's composite video signal to the input of a Video Tape Recorder and for determining whether that signal or a signal from an alternate source is to be coupled to the receiver's video processing circuitry.

DISCLOSURE OF THE INVENTION

The invention is a video switch comprising diode means having inputs adapted to be coupled to a primary and an alternate source of video signals. Control means, coupled to the output of the diode means, varies the voltage applied to the diode means and thereby determines which of said video sources is coupled to the receiver's video processing circuitry.

The subject video switch represents a relatively simple and cost-effective interface between the video processing portion of a television receiver and alternate sources of video signals, such as video discs and tape recorders. Applying these peripheral sources of video signals directly to the receiver's video circuit, rather than to the receiver antenna terminals, which would entail a modulation and demodulation process, has been found to result in improved picture quality.

BRIEF DESCRIPTION OF THE DRAWING

The sole drawing is a schematic diagram of the subject video switch.

BEST MODE FOR CARRYING OUT THE INVENTION

For a better understanding of the present invention, together with objects, advantages and capabilities thereof, reference is made to the following disclosure and appended claims in connection with the above described drawing.

Referring now to the drawing, in a standard fashion the demodulated composite video signal including, inter alia, luminance, chrominance and synchronizing components, is coupled from the output of the receiver's video detector (not shown) through a buffer 10 and AC coupling capacitor 20 to the input of an amplifier 30. Buffer 10 provides a quiescent DC output level of 6-volts. Amplifier 30 includes a transistor Q1 having a collector connected to a 12-volt supply, a base coupled through a resistor R31 to the 12-volt supply and through a resistor R32 to ground, and an emitter coupled through a resistor R33 to ground. The emitter of Q1 is AC coupled through a series connected capacitor C31 and resistor R34 to the input of the Video Tape Recorder (VTR) 40. R34 is chosen to present an impedance of approximately 75 Ohms at the input of the VTR.

The output of the VTR, or some other alternate source of video signals, is coupled to the input of an amplifier 50 including a transistor Q2. Q2 has a collector coupled through a resistor R51 to the 12-volt supply. The base of Q2 is coupled through a resistor R52 to the 12-volt supply and to ground through a resistor R53. The emitter of Q2 is coupled through a resistor R54 to the output of the VTR which is in turn coupled to ground through a resistor R55. In a specific embodiment of this invention R51–55 have values 1 K ohm, 9.6 K ohm, 2.4 K ohm, 450 ohms, and 90 ohms respectively. Given these values, amplifier 50 will present the desired 75 ohm impedance at the output of the VTR and provide a voltage gain of 2, and a DC voltage of about 9-volts at its output.

The outputs of buffer 10 and amplifier 50 are coupled to respective first and second inputs of a diode means 60. Diode means 60 includes a first diode D1 having an anode coupled to the output of buffer 10 and a second diode D2 having a cathode coupled to the output of amplifier 50. The cathode of D1 and the anode of D2 are coupled to control means 70 for determining which source of video signals is coupled to the receiver's video processing circuitry (not shown). Control means 70 includes a resistor R71 coupled between a 24-volt supply and a resistor R72. R72 is coupled from the output of the diode means through a SPST switch SW1 to a reference potential, ground.

Operation of the video switch is as follows. R71 and R72 are chosen (possible values: 24 K and 2 K ohm, respectively) so that with SW1 closed the 6-volt output of buffer 10 forward biases D1 and, because of the nominal 9-volt output of amplifier 50, D2 is reverse biased or nonconducting. As a result the output of buffer 10 will appear at the output of the diode means but the output of amplifier 50, and hence the output of the VTR, will be isolated from it.

Conversely, with SW1 open D2 will become forward biased, i.e., conducting, and D1 reversed biased. As a result the output of the VTR will be coupled through amplifier 50 to the output of the diode means and the receiver's video processing circuitry.

It should be pointed out that, although an output of the VTR is shown as the input to amplifier 50, it would be obvious to coupled other types of equipments, for example, home video games, at the point. In this mode of operation, the demodulated composite video signal would be recorded by the VTR but an image derived from an alternate source of video signals would be displayed on the receiver's CRT.

Accordingly, while there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

The subject video switch is useful in equipments to which are selectively applied signals from a plurality of sources, particularly in television receivers intended to be coupled to peripheral equipments such as video tape recorders, video discs and home video games.

What is claimed is:

1. A video switch for selecting between alternate sources of video signals comprising:
   a primary source of video signals;
   an alternate source of video signals;
   diode means having a first diode and a second diode, each of said diodes having a cathode and an anode;
   the cathode of said first diode being connected to the anode of said second diode and providing an output;
   one of said sources of video signals being coupled to the anode of said first diode;
   the other of said video sources being coupled to the cathode of said second diode; and
   bias control means connected to said diode means to selectively bias said diodes so that video signals from the selected source will appear at said output.

2. The invention according to claim 1 wherein said bias control means comprises a first power supply, a second power supply, a ground, a first resistance connected between said output and said first power supply, and a second resistance and a control switch connected in series between said output and ground.

3. The invention according to claim 2 having a first power supply voltage and a second power supply voltage selected such that when said control switch is closed said first diode is forward biased and said second diode is reverse biased whereby video signals from said one source appear at the output, and when said control switch is open said first diode is reverse biased and said second diode is forward biased whereby video signals from said other source appear at the output.

* * * * *